INVENTOR.
Matthew S. Andrzejewski
BY Walter J. Schlegel, Jr.
Atty.

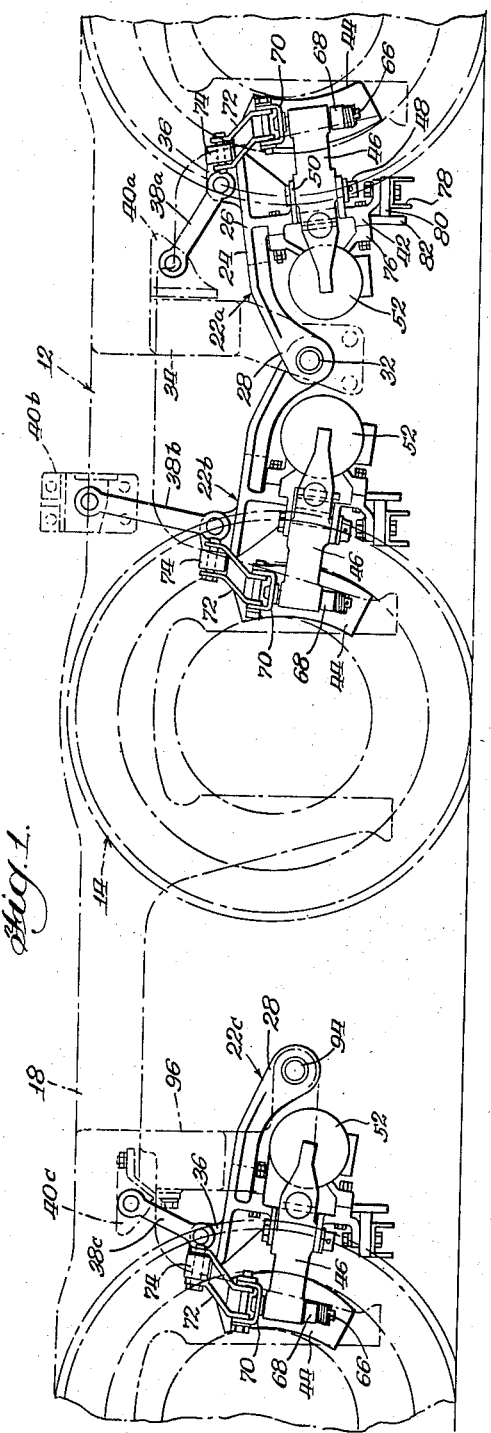

United States Patent Office 2,890,768
Patented June 16, 1959

2,890,768
ROTOR BRAKE

Matthew S. Andrzejewski, Chicago, Ill., assignor to American Steel Foundries, Chicago, Ill., a corporation of New Jersey Application December 10, 1956, Serial No. 627,196

8 Claims. (Cl. 188—59)

The present invention relates to a brake arrangement and more particularly to such brake arrangement for use with a railway car truck.

An object of the invention is to provide a brake of unit construction especially adaptable individually to the wheels of a truck. This feature facilitates adaption of a number of such units of identical construction to a six-wheel truck.

Another object is to provide a brake of the general character noted that is of simple construction and easily mounted on the truck frame.

Still another object is to provide a novel brake arrangement of such construction as to facilitate its mounting on a railway car truck where a minimum of clear space exists, and where mounting of brakes of types heretofore known was found difficult or even impossible.

A further object is to provide a novel brake construction in which the braking torque is transmitted directly to the truck frame rather than to any of the braking mechanism.

Other objects and advantages of the invention will appear from the following description taken in conjunction with the accompanying drawings, in which:

Figure 1 is a side elevational view of a railway car truck in which a plurality of brake units of the present invention are incorporated;

Figure 2 is a plan view of the structure shown in Figure 1;

Figure 3:
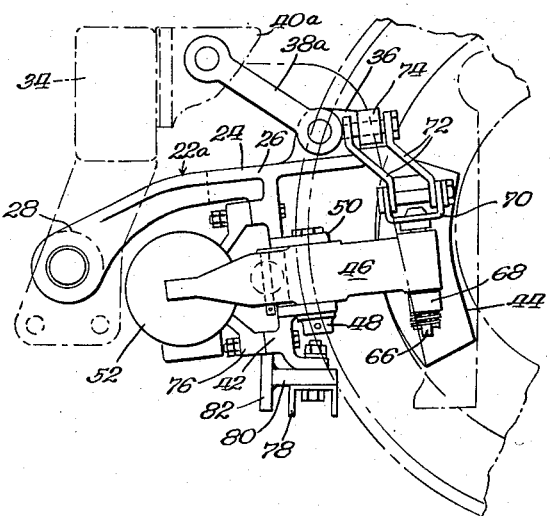
Figure 3 is an enlarged side elevational view of one of the brake units; this unit being the right-hand unit of Figure 1.

Referring in detail to the drawings, a railway car truck indicated in its entirety by the numeral 12 is utilized for embodying the brake unit of the invention. This truck is a six-wheel truck. The brake units are applied individually to the wheels, and mounted individually on the truck. The truck is of conventional nature and includes three wheel-and-axle assemblies 14 supporting the truck, one wheel of each assembly being shown. Associated with each wheel is a rotor 16 disposed inboardly of the respective wheel. The wheel and axles and rotors are of conventional nature and need not be further described in detail.

The truck frame 12 includes side rails 18 extending longitudinally of the truck and interconnected by transverse members or transoms 20 extending transversely of the truck and preferably formed integrally with the side rails 18.

The brake units indicated at 22 are mounted on the car frame 12 individually to the wheels, there being three such units, identified as 22a, 22b and 22c, respectively, on each side of the truck, these three being illustrated in Figures 1 and 2. The units 22 are all substantially identical in their main construction, but differ in the supporting links, which will be referred to again hereinbelow.

Since the brake units are mainly identical, a description of one will suffice for all and attention is directed first to the right-hand unit 22a, of the three shown. Each brake unit includes a main supporting member 24 in the form of a casting and of substantial size and massiveness. The unit is disposed longitudinally in relation to the respective rotor 16 and has a main body portion 26 with a pair of transversely spaced mounting lugs 28 extending rearwardly from the end of the body portion 26. However, it is to be noted that the units may be disposed reversely and these mounting lugs, therefore, may extend in opposite directions as respects oppositely mounted units. The support 24, when mounted in position, is disposed in alignment with the associated rotor 16 so that its longitudinal center line 30 (Figure 2) which is symmetrical with the body portion 26, is aligned with the central vertical plane of the rotor. However, the mounting lugs 28 are offset from the longitudinal center line of the body portion in the same direction, for alternate positioning with the respective lugs on another brake unit (e.g., 22b) having a common mounting means (Figure 2). The mounting lugs 28 receive a pin 32 supported in a bracket 34, secured to and depending from the adjacent portion of the longitudinal side member 18 of the frame. This bracket 34 has laterally spaced portions between which the lugs of the support are disposed. This pin also supports the corresponding end of another brake unit, which will be referred to again hereinbelow.

Figure 5:
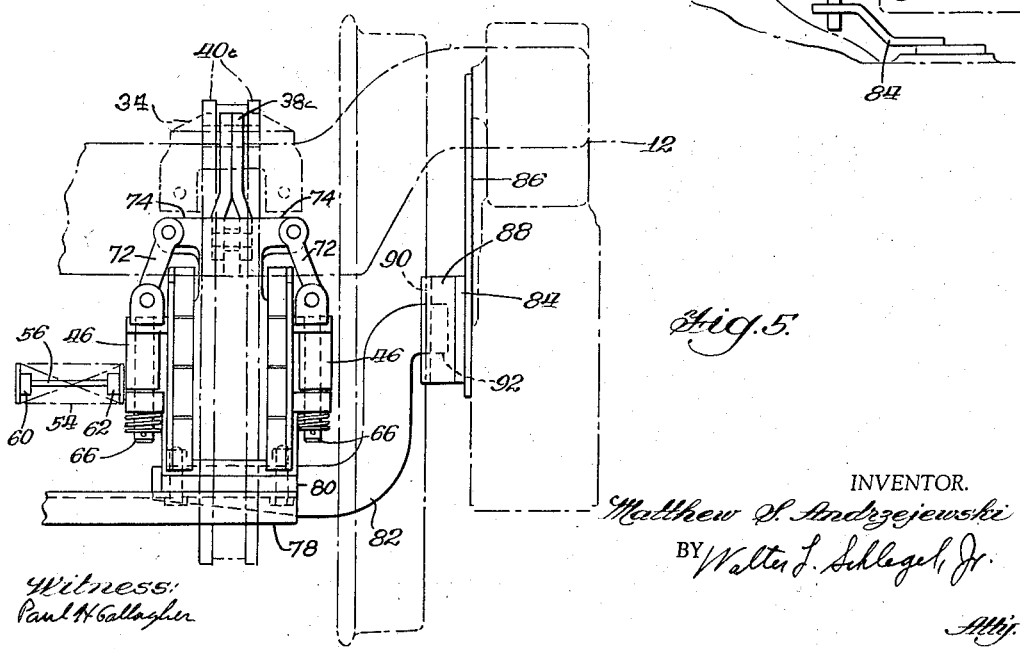
Figure 5 is an end view of a brake unit taken from the left of Figure 1.

Adjacent the front end of the support member 24 is a central upstanding flange 36 utilized for mounting that end of the support. The mounting means for this end of the support includes a link 38a pivotally connected at its lower end with the flange 36 and at its upper end with the bracket 34 on the side frame member. The brake unit is supported solely at the two points mentioned, namely, by the pin 32 and the link 38 and has its support directly from the truck frame side member. The link 38, for convenience, may be actually in the form of a pair of link elements, as illustrated in Figure 5. The links supporting the various brake units are generally similar but are different in lengths. These links are identified by numbers 38a, 38b and 38c, the link 38c being shown in Figure 5, and, as there shown, is made up of separate link elements straddling the flange 36 at the lower end and disposed between bracket elements 40c on the bracket 34 at the upper end.

The support 24 of the brake unit also includes a downward extension 42 preferably formed as an integral part of the upper main body portion 26 and which serves as the means for mounting the braking elements and the power means for actuating the latter. The braking elements includes brake heads and shoes 44 of conventional nature mounted on arms 46 which are pivoted intermediate their ends by pins 48 disposed in bracket elements 50 on the extension 42. The braking elements 44 are disposed on opposite sides of the associated rotor and arranged for movement into and out of braking engagement with the opposite friction surfaces of the rotor. The arms 46 are actuated by conventional power means such as a double cylinder 52 disposed between the arms 46 at the ends opposite the braking elements and arranged for expansion outwardly and consequent actuation of the arms for moving the braking elements into braking position. Upon release of the force provided by the piston 52, the arms 46 and braking elements 44 are moved in releasing direction by a spring 54 (Figure 2) surrounding a rod 56 and compressed between an end element 60 on one end of the rod and another element 62 slidable on the rod and engageable with the adjacent arm 46. The rod 56 extends through an aperture in the adjacent brake arm 46 and is connected to the opposite arm by a pivotal connection 64. Upon release of the braking force, the compression spring 54 serves to swing the associated ends of the brake arms together and move the braking elements out of engagement with the rotor. This means for releasing the brakes is conventional.

The braking elements 44 are mounted by conventional means such as pins 66 fitted in lugs 68 on the brake heads and in bearing apertures in the front ends of the brake arms 46. Pivoted on the upper end of each pin 66 is a U-shaped clip 70 pivotally mounting the lower end of link elements 72, the upper ends of which are pivotally mounted in lugs 74 on the body portion 26 of the support. The lugs 74 extend laterally a substantial distance for accommodating the generally vertical disposition of the links 72. These links serve to receive the torque from the braking elements and transmit it directly to the support member 24 of the brake unit.

The downward extension 42 of the support member 24 serves also as a means for mounting the cylinder 52. The cylinder has mounting lugs 76 which may form part of the rigid frame of the cylinder and secured to the extension 42 by suitable means such as bolts. The brake arms 46 with the braking elements thereon and the cylinder means 52 are thus all mounted directly on the support 24. The torque from the braking elements is also transmitted to the support. This member is supported from the truck frame at only two points, i.e., by means of the link 38a and the mounting lugs 28. The brake unit can be supported by a conventional truck frame with a minimum of adaptations for accommodating the brake unit. The means for mounting the brake unit need be nothing more than the bracket 34 and the bracket elements 40 which are disposed relatively longitudinally in line with and below the respective side frame element. There is no necessity for transverse members for mounting the brake units that are not included in the basic structure of the frame.

Figure 4:
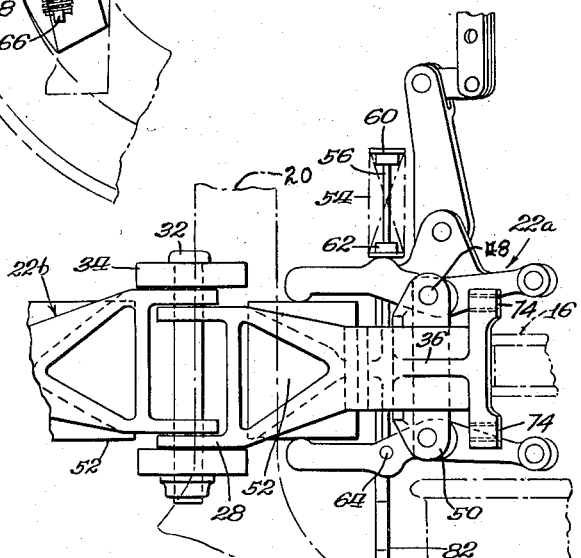
Figure 4 is a plan view of the unit shown in Figure 3.

Safety means are provided for preventing the brake units from falling in the event that the normal support means therefor should become impaired. A transverse tie bar 78, which may be channel-shaped if desired, extends across the truck under the pair of brake units that are aligned transversely. This bar is secured to the extensions 42 of the two units by convenient means, such as bolts. Preferably a piece 80 is interposed between the tie bar and each extension 42, to which is secured at each end as by welding, a member 82 (Figures 4 and 5) generally hook-shaped and extending outboardly from the brake unit and upwardly into operative relation with a bracket 84 mounted on the frame. The specific mounting of this bracket 84 may be by means of a plate 86 secured to the frame 12 in a suitable manner such as by welding. The bracket 84 has an inboardly extending portion 88 provided with an aperture 90 receiving the adjacent end 92 of the element 82. Normally, the element 82 and aperture 90 are so related that the former is out of contact with the marginal edge of the aperture but in the event the brake unit should drop, the outer end of the element 92 will engage the lower marginal edge of the aperture and hold it against dropping to the ground.

The units 22 may be utilized individually or in pairs. The two right-hand units 22a and 22b (Figures 1 and 2) have a common mounting means therebetween in which is mounted one end of each unit. Referring to Figure 2, it will be noted that the mounting lugs 28 of the two units are in staggered or alternate relation in transverse direction. This staggered relation enables the longitudinal center line 30 of the two units to be in alignment and furthermore in alignment with the center vertical planes of the respective rotors 16. Thus either of the brake units 22a or 22b could be used in the place of the other with accurate alignment of the longitudinal center lines. There is no necessity for making two kinds of units. As noted above, the mounting links 38a, 38b and 38c constitute the single variation from identical construction. These links are of different lengths and extend in slightly different direction to accommodate mounting at their upper ends by accessible and convenient lugs on the truck frame. When two brake units such as 22a and 22b are mounted in a pair, the fact of the common mounting bracket works toward economy and facility in mounting the units. If either one, or any one, brake unit is to be mounted singly, it can be so mounted without regard to the mounting of other brake units. Such phenomena is represented in the leftmost brake unit 22c of Figures 1 and 2. In this case, the mounting lugs 28 are mounted on a pin 94 in turn mounted in a bracket 96 on the truck side frame. The link 38c is mounted at its upper end on bracket elements 40c.

In the case of the mounting of a single brake unit such as 22c, spacers 100 of different thicknesses (Figure 2) are utilized for positioning the mounting lugs 28 of the unit so as to align the longitudinal center line of the brake unit with the center vertical plane of the associated rotor.

The usual hand brake means is provided and may be disposed in any convenient location. The inboard brake lever 46 of each unit may be provided with a lug 102 (Figure 2) to which is secured an end of a lever arm 104. At the other end of the lever arm 104 is pivoted a link 106 which is also pivoted to an actuating arm 108, the latter being actuated by the usual hand mechanism.

I claim:

1. In combination with a railway car truck frame and a pair of wheel-and-axle assemblies supporting the frame end respectively having wheels spaced from each other longitudinally of the frame, said assemblies having rotors associated with respective wheels, a pair of substantially identical brake units associated with longitudinally aligned rotors, the units of said pair being oppositely disposed longitudinally of the frame, each unit including a support disposed generally below the frame and having a pair of transversely spaced mounting lugs at a first end offset laterally in the same direction from the longitudinal center line of the support, said lugs of both pairs being mounted on a common frame-supported pin and being alternately arranged as between the two supports whereby the longitudinal center lines of the supports are aligned with one another and with the rotors, support means connecting the opposite end of each support to the frame, and brake means carried by each support for braking the associated rotor.

2. A brake arrangement for a railway car truck including a frame, an axle and wheels, and rotors adjacent the wheels, comprising a brake unit for each rotor including a support mounted at spaced points on the frame, brake heads on opposite sides of the rotor, lever arms mounting the brake heads and pivotally mounted on the support, power means for actuating the lever arms, link means interconnecting the brake heads and support for transmitting torque from the brake heads directly to the support, a transverse bar below the units, said bar being connected thereto and supported thereby, and bracket means carried directly by the frame and axially aligned with the ends of the transverse bar for receiving and supporting the same in the event of dropping thereof as by failure of normal support of the unit.

3. A brake arrangement for a railway car truck including a frame, an axle and wheels, and rotors adjacent the wheels, comprising a brake unit for each rotor, a main upper support extending longitudinally of the frame and mounted thereon at the ends of said support, the support having a downward extension, lever arms pivotally mounted intermediate their ends on said extension, brake heads mounted on the lever arms at one end, power means mounted on said extension and engageable with the other ends of the lever arms for actuating the brake heads, a transverse bar disposed below and between the units and connected thereto at the lower ends of said extensions, said bar being carried by the units, and bracket means secured directly to the frame and axially aligned with the ends of the transverse bar for receiving and supporting the same in the event of dropping thereof as by failure of normal support of the unit.

4. A brake arrangement for a railway car truck including a frame, wheel-and-axle assemblies having a plurality of wheels and rotors on the axles associated with respective wheels, a pair of said wheel-and-axle assemblies having a plurality of oppositely directed brake units arranged in pairs, said pairs of brake units being disposed below and away from said frame, the units of each pair having a common pivotal connection therebetween, each of said pairs of units comprising a pair of support members extending substantially longitudinally of the truck, each of said support members having bifurcated end portions connected to said pivotal connection, each of said support members of said pairs having their end portions alternately arranged along said pivotal connection, at least one of said support members having its end portions off-set laterally of the truck, said pair of support members having their longitudinal center lines aligned, said longitudinal lines being aligned with the central vertical plane of the related rotors, and brake means carried by said support members for braking respective rotors.

5. In combination with a railway car truck frame and a pair of wheel-and-axle assemblies supporting the frame respectively having wheels spaced longitudinally of the frame, and rotors adjacent the wheels, a plurality of substantially identical brake units arranged in pairs with each pair associated with longitudinally aligned rotors, and the units of each pair oppositely disposed longitudinally of the frame, each unit including a support disposed generally horizontally below the frame and having transversely spaced mounting lugs at a first end offset laterally in the same direction from the longitudinal center line of the support, said lugs of each pair being mounted on a common pin in the frame and being alternately arranged as between the two supports whereby the longitudinal center lines of the supports are aligned with one another and with the rotors, means supporting the opposite end of the support to the frame, a pair of lever arms on each support pivoted intermediate their ends on the support, brake heads on the lever arms at one end disposed on opposite sides of the associated rotor, torque transmitting links interconnecting the brake heads and the respective support, and power means mounted on each support in operative association with the lever arms at the ends thereof opposite the brake heads for actuating the brake heads.

6. Brake means for a railway car truck having a frame and a plurality of wheel-and-axle assemblies, and a brake rotor associated with each wheel, comprising a plurality of brake units, one for each rotor, mounted on and below the frame solely at two longitudinally spaced points, each unit including braking elements operatively associated with the respective rotor, and power means for operating the braking elements, a transverse bar carried by and extending under and between transversely aligned brake units, and brackets axially aligned with ends of the bar, each of the brackets having an aperture, said brackets being carried by the frame, said aperture receiving the end of the related bar and being out of marginal contact therewith, the lower marginal limits of said aperture engaging the end of the transverse bar for supporting the latter in the event of failure of the means normally supporting the units.

7. A brake arrangement for a railway car truck including a frame, wheel and axle assemblies having a plurality of wheels and rotors on the axles associated with each of said wheels, a pair of said wheel and axle assemblies having a plurality of oppositely directed brake units arranged in pairs, said pairs of brake units being disposed generally horizontally below and away from said frame, the units of each of said pairs having a common pivotal connection therebetween, each of said pairs of units comprising a pair of support members extending substantially longitudinally of the truck, each of said support members having bifurcated end portions connected to said pivotal connection, each of said support members of said pair having their end portions alternately arranged along said pivotal connection, at least one of said support members having its end portions offset laterally of the truck, said pair of support members having their longitudinal center lines aligned, said longitudinal lines being aligned with the central vertical plane of the related rotors, brake levers carried intermediate their ends by each of the support members, friction means pivotally connected to corresponding ends of the brake levers and adapted to frictionally engage the related rotors, and power means carried by each of the support members and connected to the opposite corresponding ends of the related brake levers.

8. A brake arrangement for a railway car having a frame, a plurality of wheel and axle assemblies, brake rotors affixed to the axles of said assemblies and disposed adjacent the wheels of said assemblies, said arrangement comprising pairs of oppositely directed brake units disposed between two of said assemblies and being engageable with the related brake rotors on said two assemblies, said arrangement also comprising individual brake units engageable with the related rotors of another of said assemblies, each of said pairs of brake units comprising a pair of support members having bifurcated end portions offset transversely of the frame in opposite directions, each of said individual brake units comprising a support member having a bifurcated end portion offset transversely of the frame, said pair of support members having their longitudinal axes aligned with each other and with the longitudinal axis of said support member, all of said axes being coplanar with the vertical center plane of the related rotors, one of said pair of support members and said individual support member having their related bifurcated end portions offset in the same direction, a common pivotal connection carried by the frame between the end portions of each of said pair of support members, said end portions of each of said pairs being alternately arranged along said common pivotal connection, a pivotal connection between the frame and each individual support member, links connecting the ends of the pairs of brake units and individual brake units opposite said pivotal connections to the frame, friction means operatively carried by respective support members, and power means operatively connected to the related friction means.

References Cited in the file of this patent

UNITED STATES PATENTS

| | | |
|---|---|---|
| 1,806,214 | Perry | May 19, 1931 |
| 2,253,199 | Sabold | Aug. 19, 1941 |
| 2,274,859 | Eksergian | Mar. 3, 1942 |
| 2,343,342 | Tack | Mar. 7, 1944 |
| 2,377,190 | Tack | May 29, 1945 |
| 2,567,157 | Tack et al. | Sept. 4, 1951 |
| 2,702,097 | Tack et al. | Feb. 15, 1955 |
| 2,815,096 | Tack | Dec. 3, 1957 |